United States Patent [19]

Class

[11] Patent Number: 5,686,537
[45] Date of Patent: Nov. 11, 1997

[54] CONTROLLING PREMATURE CURING OF VULCANIZABLE HALOGEN-CONTAINING POLYMERS

[75] Inventor: Jay Bernard Class, Wilmington, Del.

[73] Assignee: Hercules Incorporated, Wilmington, Del.

[21] Appl. No.: 459,017

[22] Filed: Jun. 1, 1995

Related U.S. Application Data

[63] Continuation of Ser. No. 184,719, Jan. 21, 1994, abandoned, which is a continuation-in-part of Ser. No. 168,696, Dec. 16, 1993, abandoned.

[51] Int. Cl.$^6$ .................................................. C08F 8/30
[52] U.S. Cl. ............................ 525/349; 525/384; 525/403
[58] Field of Search .................................. 525/349, 384, 525/403

[56] References Cited

U.S. PATENT DOCUMENTS

| | | | |
|---|---|---|---|
| 3,355,423 | 11/1967 | Scullin et al. | |
| 4,128,510 | 12/1978 | Richwine | 525/349 |
| 4,288,576 | 9/1981 | Richwine | 525/349 |
| 4,399,262 | 8/1983 | Jablonski | 525/349 |
| 4,434,274 | 2/1984 | Jablonski | 525/349 |
| 4,482,681 | 11/1984 | Berta et al. | 525/349 |
| 4,745,147 | 5/1988 | Honsberg | 524/386 |

FOREIGN PATENT DOCUMENTS 0221313  5/1987  European Pat. Off..

OTHER PUBLICATIONS

Hercules Incorporated Bulletin ELA-101A "Echo™S Vulcanizing Agent".
Hercules Incorporated Bulletin ELA-102 "Echo™P Vulcanizing Agent".
European Search Report.
U.S. application No. 08/168,695, Class, filed Dec. 16, 1993.
U.S. application No. 08/168,694, Class, filed Dec. 16, 1993.
U.S. application No. 08/184,714, Class, filed Jan. 21, 1994.
U.S. application No. 08/184,713, Class, filed Jan. 21, 1994.
U.S. application No. 08/184,719, Class, Jan. 21, 1994.
ASTM D 2084-92—"Standard Test Method for Rubber Property—Vulcanizing Using Oscillating Disk Cure Meter".

*Primary Examiner*—Christopher Henderson
*Attorney, Agent, or Firm*—Mark D. Kuller; Robert P. O'Flynn O'Brien; Robert Reichert

[57] ABSTRACT

Controlling premature curing of vulcanizable halogen-containing polymer compounds.

43 Claims, 2 Drawing Sheets

# CONTROLLING PREMATURE CURING OF VULCANIZABLE HALOGEN-CONTAINING POLYMERS

This application is a continuation of application Ser. No. 08/184,719, filed Jan. 21, 1994, now abandoned which is a continuation-in-part of U.S. patent application Ser. No. 168,696, filed Dec. 16, 1993, now abanboned.

This invention relates to vulcanizable halogen-containing polymer compositions and their preparation.

BACKGROUND OF THE INVENTION

In the production of vulcanized halogen-containing polymer, the use of mercapto compounds as crosslinking agents, and the use of various other additives to improve curing speed, strength and stability of the vulcanizates are known. See the hereinafter referred to patents, all of which are incorporated herein by reference. Vulcanization by these conventional techniques tends to be erratic and not reproducible if a mixed uncured composition has been stored. Scorching of the fresh unvulcanized (green) material takes place during storage, even at room temperature, which affects the cure conditions required to manufacture useful parts.

Scorching is thought to be the premature start of the curing reaction, including some crosslinking, which affects subsequent curing of the material. This may reduce the cure time to the point where the compound cures before the part is properly molded. Scorched compound my be partially gelled and have a higher viscosity than unscorched compound. This may reduce flow so that molds cannot be filled completely. Often improperly cured products must be discarded.

It has been observed that differences in water content of the compositions appear to be largely responsible for the scorching. Water my be absorbed by the green compositions from humidity in the air, or by inclusion in the individual ingredients, notably carbon black. Such vulcanizable compositions absorb water in normal storage, usually in an amount ranging from about 0.05% to about 2% by weight depending on the relative humidity and the length of storage.

U.S. Pat. No. 4,128,510 describes the use of broad classes of derivatives of 2,5-dimercapto-1,3,4-thiadiazole as crosslinking agents for halogen-containing polymers to produce vulcanizates of increased strength and stability.

U.S. Pat. No. 4,288,576 discloses the use as the crosslinking agent of 2,5-dimercapto-1,3,4-thiadiazole in the presence of certain basic materials to produce vulcanizates of good stability.

U.S. Pat. No. 4,482,681 shows the use of a crosslinking system for halogen-containing polymers made up of a polymercapto compound or an ester derivative thereof as the crosslinking agent, a basic material and a hydrated salt to increase the rate of crosslinking.

U.S. Pat. No. 4,745,147 discloses curable compositions comprising chlorinated polyethylene, a polymercapto compound, an aliphatic polyhydroxy compound, an inorganic acid acceptor and an initiator which is an amine, or a quaternary ammonium salt or a quaternary phosphonium salt. Aliphatic polyhydroxyalcohols mentioned include 2,2-dimethyl-1,3-propanediol, ethylene glycol, glycerol, 1,2-propanediol, dipentaerythritol and pentaerythritol.

SUMMARY OF THE INVENTION

It has been found that water-induced scorching of halogen-containing polymer vulcanizable compositions can be masked, greatly decreasing the effect of water-induced scorching by (1) selecting a thioester derivative of 2,5-dimercapto-1,3,4-thiadiazole as the crosslinking agent and (2) including in the compositions glycerin (GLY). Accordingly, this invention relates to a process of reducing the effects of moisture during storage prior to vulcanization of a vulcanizable halogen-containing polymer composition containing water, comprising blending before storage, into said vulcanizable composition, a thioester derivative of 2,5-dimercapto-1,3,4-thiadiazole crosslinking agent and glycerin, whereby the scorch time of the vulcanizable compound is not significantly affected by the water content of said composition.

Preferably, the crosslinking agent is 2-mercapto-1,3,4-thiadiazole-5-thiobenzoate. More preferably, there is included in said composition about 1 to 20 phr 2-mercapto-1,3,4-thiadiazole-5-thiobenzoate and about 0.1 to 20 phr of glycerin.

Preferably, according to this process, the cure time of the vulcanizable compound is not significantly affected by the water content of said composition.

Preferably, when the vulcanizable composition is stored in the presence of moisture (i.e., humidity) $t_s2$ (defined hereinafter) does not decrease by more than about 30% after storage for 1 day. More preferably, when the vulcanizable composition is stored in the presence of moisture $t_s2$ and $t_{90}$ (defined hereinafter) do not decrease by more than about 30% after storage for 1 day. Even more preferably, when the vulcanizable composition is stored in the presence of moisture $t_s2$ does not decrease by more than about 20% after storage for 1 day. Most preferably, when the vulcanizable composition is stored in the presence of moisture $t_s2$ and $t_{90}$ do not decrease by more than about 5% after storage for 1 day.

When the vulcanizable composition is stored in the presence of moisture, $t_s2$ and $t_{90}$ preferably do not decrease by more than about 50%, more preferably about 30%, and most preferably about 15%, after storage for 4 days.

Preferably, when the vulcanizable composition is stored in the presence of moisture $t_s2$ and $t_{90}$ do not decrease by more than about 50%, more preferably about 40%, and most preferably about 15%, after storage for 7 days.

Preferably, there is included in said composition about 0.5 to 5 phr of 2-mercapto-1,3,4-thiadiazole-5-thiobenzoate and about 0.5 to 10 phr of glycerin. More preferably, there is included in said composition about 1.0 to 5 phr of glycerin.

Preferably, there is included in said composition an acid acceptor and an accelerator. More preferably, there is included in said composition an acid acceptor in an amount of from about 0.25 phr to 50 phr, and an accelerator in an amount of from about 0.5 phr to 3 phr.

Under some circumstances, there is preferably included in said composition a stabilizer, preferably in amount of about 0.1 phr to 5 phr of a stabilizer.

Preferably, the vulcanizable halogen-containing polymer is chlorinated polyethylene polymer and $t_{90}/t_s2$ is below 4, more preferably below 3.

The ratio $t_{90}/t_s2$ does not change after 1, 4 or 7 days of storage in the presence of moisture by more than preferably about 35%, more preferably about 20%, and most preferably about 5%.

Preferably, the vulcanizable halogen-containing polymer is selected from the group consisting of homopolymers of epichlorohydrin, copolymers of epichlorohydrin and ethylene oxide or propylene oxide, terpolymers of epichlorohydrin, ethylene oxide or propylene oxide, and an unsaturated alkylene oxide, polychloroprene, chlorosulfonated polyethylene, chlorinated high density polyethylene, copolymers of alkyl acrylate and chloroalkyl acrylate, poly (vinyl fluoride), poly(vinyl chloride), poly(vinylidene chloride), and chlorobutyl rubber and bromobutyl rubber.

A preferred vulcanizable halogen-containing polymer for the processes and compositions of this invention is chlorinated polyethylene polymer. Other preferred vulcanizable halogen-containing polymers are epichlorohydrin polymers, copolymers, and terpolymers, polyacrylate rubber (polyalkyl acrylates containing a low concentration of chlorine as a crosslinking site), polychloroprene rubber, chlorobutyl rubber and bromobutyl rubber.

The invention is also directed to a vulcanizable halogen-containing polymer composition comprising a thioester derivative of 2,5-dimercapto-1,3,4-thiadiazole crosslinking agent and glycerin, said composition having a scorch time that is not significantly affected by the presence of water in the composition. Preferably, the crosslinking agent is 2-mercapto-1,3,4-thiadiazole-5-thiobenzoate. More preferably, the composition comprises about 1 phr to 20 phr of said crosslinking agent and about 0.1 phr to 20 phr glycerin.

Preferably, said composition has a cure time that is not significantly affected by the presence of water in the composition.

Preferably, said composition is capable of being stored for 1 day at ambient conditions of about 23° C. and 50% relative humidity with $t_s2$ of the composition decreasing no more than about 30% during such storage. More preferably, said composition is capable of being stored for 1 day at ambient conditions of about 23° C. and 50% relative humidity with $t_{90}$ of the composition decreasing no more than 30% during such storage. Even more preferably, said composition is capable of being stored for 1 day at ambient conditions of about 23° C. and 50% relative humidity with $t_s2$ and $t_{90}$ of the composition decreasing no more than 20% during such storage. Most preferably, said composition is capable of being stored for 1 day at ambient conditions of about 23° C. and 50% relative humidity with $t_s2$ and $t_{90}$ of the composition decreasing no more than about 5% during such storage.

Preferably, said composition is capable of being stored for 4 days at ambient conditions of about 23° C. and 50% relative humidity with $t_s2$ and $t_{90}$ of the composition decreasing no more than about 50% during such storage, more preferably with $t_s2$ and $t_{90}$ of the composition decreasing no more than about 30% during such storage, and most preferably with $t_s2$ and $t_{90}$ of the composition decreasing no more than about 15% during such storage.

Preferably, said composition is capable of being stored for 7 days at ambient conditions of about 23° C. and 50% relative humidity with $t_s2$ and $t_{90}$ of the composition decreasing no more than about 50% during such storage, more preferably with $t_s2$ and $t_{90}$ of the composition decreasing no more than about 40% during such storage, and most preferably with $t_s2$ and $t_{90}$ of the composition decreasing no more than 15% during such storage.

Preferably, the substantially dry unstored composition is capable of being stored for 1, 4 or 7 days at ambient conditions of about 23° C. and 50% relative humidity without $t_{90}/t_s2$ changing by more than about 35%, more preferably by more than about 20%, and most preferably by more than about 5%.

This invention is also directed to a composition in the form of a dry pourable powder cure premix composition for inclusion in a halogen-containing vulcanizable polymer composition, comprising a thioester derivative of 2,5-dimercapto-1,3,4-thiadiazole crosslinking agent, glycerin and a pourable siliceous finely divided filler. Preferably, the finely divided filler is selected from the group consisting of silica, talc and clay and is present in an amount of about 10 to 50% by weight of the composition. Preferably, the crosslinking agent is 2-mercapto-1,3,4-thiadiazole-5-thiobenzoate.

The vulcanizable compositions of this invention exhibit more uniform scorching over a prolonged period of storage, little affected by the moisture content of the mixture after storage. Also, scorching during storage is decreased. The present invention compositions, with changes in ingredients and their amounts, may give mixtures of different scorch characteristics. However, batches of the same ingredients in the same amounts will exhibit substantially the same scorch characteristics irrespective of the moisture content of the initial ingredients, the storage relative humidity, and length of storage. Consequently, these compositions give vulcanizates of highly uniform curing characteristics and cured physical properties when vulcanized under the same conditions.

This invention is also directed to a process of reworking a vulcanizable halogen-containing polymer composition comprising sequentially blending before storage, into said vulcanizable composition, a thioester derivative of 2,5-dimercapto-1,3,4-thiadiazole crosslinking agent and glycerin, storing the vulcanizable halogen-containing polymer composition for one or more days, testing a sample of the vulcanizable halogen-containing polymer composition for at least one property selected from the group consisting of the cure rate or the scorch rate of the vulcanizable halogen-containing polymer composition and the physical properties of the vulcanized halogen-containing composition, and reformulating the vulcanizable halogen-containing polymer composition.

Preferably, reformulating comprises adjusting the concentration in the vulcanizable halogen-containing polymer composition of at least one member selected from the group consisting the thioester derivative of 2,5-dimercapto-1,3,4-thiadiazole crosslinking agent and glycerin.

Preferably, the composition comprises one or more additive selected from the group consisting of accelerators, acid acceptors, binders, stabilizers, fillers, extenders, pigments, plasticizers, and softeners, and the reformulating comprises adjusting the concentration of the one or more additive in the vulcanizable halogen-containing polymer composition.

BRIEF DESCRIPTION OF THE DRAWINGS

FIGS. 1 and 2 show the effect of aging on the vulcanization of chlorinated polyethylene samples.

DESCRIPTION OF THE PREFERRED EMBODIMENTS

Figure 1A:
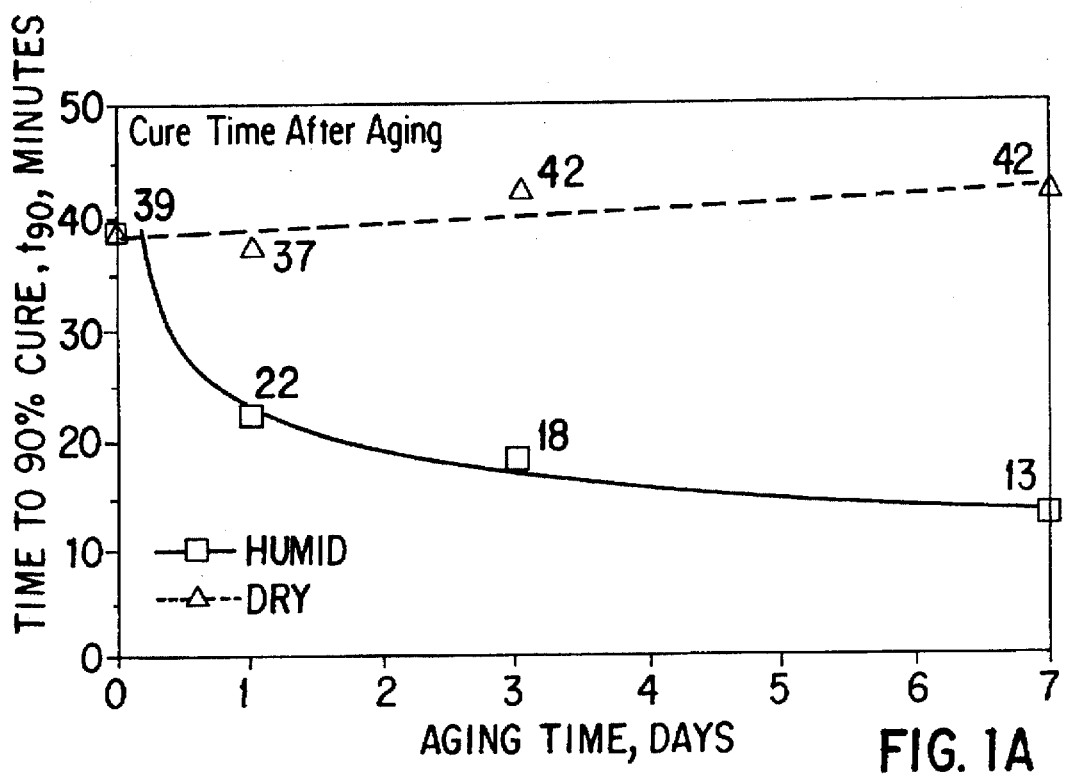
FIG. 1A shows the cure time after aging of a control sample under humid and dry conditions.

It has been found that the inclusion in halogen-containing polymer vulcanizable compositions of thioester derivatives of 2,5-dimercapto-1,3,4-thiadiazole, and particularly the monothiobenzoate ester, as the crosslinking agent, in conjunction with a small amount of glycerin (GLY), masks the scorch effect of water in the compositions of the present invention. Consequently the fabricator can store a batch of green composition for a number of days, such as 1, 4, 7 or more, and regardless of moisture absorption by the composition, will be able to process the unvulcanized composition to meet product requirements.

Herein, all parts are per hundred parts by weight rubber (phr) and percentages are by weight of the total composition except as otherwise noted.

Preferably, about 0.1 parts per hundred rubber (phr) to about 20 phr of glycerin is added to the unvulcanized compositions of the present invention, more preferably from about 0.5 phr to 10 phr, and most preferably from about 1 phr to about 5 phr.

The amount of thioester derivative of 2,5-dimercapto-1, 3,4-thiadiazole crosslinking agent added will preferably be within from about 0.1 phr to about 20 phr, more preferably from about 0.5 phr to about 5 phr.

Any saturated or unsaturated vulcanizable halogen-containing polymer, i.e. containing at least about 1% to 60% or more by weight of halogen, may be employed in the crosslinkable compositions of this invention. Typical of the halogen-containing polymers are homopolymers of epichlorohydrin; copolymers of epichlorohydrin and ethylene oxide or propylene oxide; terpolymers of epichlorohydrin, ethylene oxide or propylene oxide, and an unsaturated alkylene oxide; polychloroprene; chlorosulfonated polyethylene; chlorinated high density polyethylene; copolymers of alkyl acrylate and chloroalkyl acrylate; poly(vinyl fluoride); poly(vinyl chloride); poly(vinylidene chloride); and chlorobutyl rubber and bromobutyl rubber. A preferred vulcanizable halogen-containing polymer is chlorinated polyethylene polymer. Other preferred polymers are epichlorohydrin polymers, copolymers and terpolymers, polyacrylate rubber (polyalkyl acrylates containing a low concentration of chlorine as a crosslinking site), polychloroprene rubber, chlorobutyl rubber and bromobutyl rubber.

In addition, crosslinkable blends of halogen-containing polymers or halogen-containing polymers blended with nonhalogen-containing polymers may be used in the compositions and process of this invention. Examples of such non-halogen polymers are ethylene-propylene elastomers, nitrile elastomers, polyacrylate rubbers (non-halogen containing), and styrene-butadiene rubbers. The only requirement is that there be sufficient halogen-containing polymer present in the blend to effect crosslinking.

In practicing the present invention it may, in some cases, be desirable to add a small amount of conventional stabilizer. Total stabilizer in the present invention composition preferably is in the range of about 0.1 phr to 5 phr or more. Exemplary of the most preferable stabilizers are phenyl-β-naphthylamine, di-β-naphthyl-p-phenylenediamine, sym-di-β-naphthyl-p-phenylenediamine, styrenated diphenylamines, N-isooctyl-p-amino-phenol, the reaction product of diphenylamine and acetone, polymerized trimethyldihydroquinoline, 4,4'-thio-bis(6-tert-butyl-m-cresol), the reaction product of crotonaldehyde and 3-methyl-6-tert-butyl-phenol, nickel dibutyldithiocarbamate, the zinc salt of 2-mercaptobenzimidazole, and nickel dimethyldithiocarbamate.

An acid acceptor is preferably used in conjunction with the thioester derivative of 2,5-dimercapto-1,3,4-thiadiazole in the crosslinking process of this invention. An acid acceptor is a basic material or a material which will become basic on heating to the crosslinking temperature. Typical useful inorganic materials are basic metal oxides and hydroxides and their salts with weak acids, such as, for example, magnesium oxide, magnesium hydroxide, calcium oxide, calcium hydroxide, barium oxide, barium carbonate, lead oxides, lead acetate, sodium phenoxide and sodium acetate. The acid acceptor is added broadly, preferably from about 0.25 phr to about 50 phr, more preferably from about 0.5 phr to about 50 phr, and most preferably from about 1.0 phr to about 20 phr of the vulcanizable composition.

In the compositions of the present invention, an accelerator of the well-known types containing aliphatic or aromatic amine or quaternary nitrogen groups is used. Preferably about 0.5 to 3 phr of accelerator is used. Particularly useful accelerators are the reaction products of butyaldehyde and aniline, and tetrabutylammonium bromide.

Other ingredients commonly used in rubber vulcanization can be included, for example, fillers, extenders, pigments, plasticizers, softeners, etc. The presence of a filler and, in particular, carbon black gives very advantageous results.

The crosslinking agent and other ingredients can be incorporated or admixed with the polymer in any desired fashion. For example, they can be uniformly blended with a polymer by mixing in a high intensity internal mixer, such as a "Banbury" mixer; or by simply milling on a conventional rubber mill to prepare the green compositions of the present invention. By this means, the agents are uniformly distributed throughout the polymer and uniform crosslinking is effected when the composition is thereafter subjected to curing heat. It is generally preferable to mix at temperatures from about 170° F. to about 250° F. because the compositions are usually relatively scorch-resistant below about 250° F. in the short mixing time. Other known methods of admixing the composition are also useful.

While all of the ingredients are normally blended in a single operation, often it is possible to rework the initially blended compositions of the present invention to change the relative amounts of the ingredients or even to add an ingredient. For instance, if a sample of a composition of the instant invention made using GLY is tested prior to use in production and the scorch is too short for processing in a specific production operation, then adjustments can be made in the concentration of crosslinker and/or accelerator (e.g., amine accelerator) to increase the scorch time. Compositions prepared following prior techniques generally can not be reworked because they are likely to scorch.

The conditions under which the crosslinking is effected can be varied over a wide range. Preferably the crosslinking temperature will be within the range of broadly from about 250° F. to over 425° F. and more preferably from about 340° F. to about 400° F. The time will vary inversely with the temperature and will preferably range from about 10 seconds to 24 hours, more preferably from about 2 to about 10 minutes. While the crosslinking process can be conducted in air at atmospheric pressure, it will generally be conducted in a metal mold or in a steam autoclave at the required temperature.

For ease of incorporating the crosslinking agent into the crosslinkable polymer mixture, it may be desirable to formulate the thiadiazole derivative as a concentrate in a binder or carrier which can be added, along with the other ingredients, in small amounts to the polymer composition without adverse effect on the properties of the crosslinked composition. Particularly advantageous binders or carriers are polymers which may or may not be crosslinkable by the crosslinking agent. Suitable binders for the concentrate are, for example, ethylene-propylene rubber, ethylene-propylene terpolymers, styrene-butadiene rubber, natural rubber, low density polyethylene, amorphous polypropylene and polyisobutylene. Other suitable binders or carriers for use in the preparation of such easily handled concentrates are waxes, resins, or other low-melting solids. Typical useful materials are paraffin wax, stearic acid, microcrystalline wax, rosin, rosin esters and hydrocarbon resins. Concentrations of the thiadiazole derivative can vary from less than 30% to more than 90%, preferably from about 50% to 80%. In the final prevulcanization green mix additional amounts of one or more of the active curing compounds may be added to give the desired vulcanization and vulcanizate properties. The acid acceptor should not be incorporated in the concentrate lest it decompose the thiadiazole derivative.

Another highly effective technique for simplifying final formulation is to prepare a dry pourable powder cure premix composition comprising the 2-mercapto-1,3,4-thiadiazole-5-thiobenzoate crosslinker, the GLY and a pourable siliceous finely divided material, such as silica, talc and clay. This premix will contain enough of the filler to give a pourable powder formulation. Amounts of filler normally are about 10–50% by weight of the formulation. The remainder of the formulation usually is crosslinker and GLY in the desired proportions for the particular usage. Other inert additives may also be included. This pourable premix avoids the handling of liquids when mixing these ingredients into the green pre-vulcanization products.

Figure 1B:
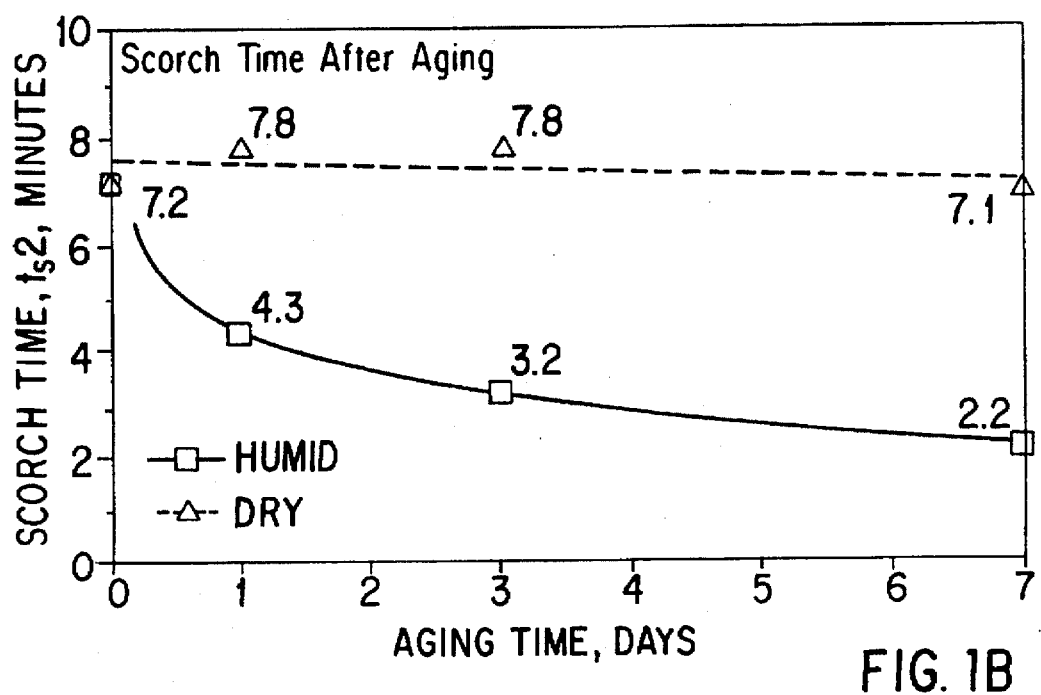
FIG. 1B shows the scorch time after aging of the control compound under humid and dry conditions.
Figure 2A:
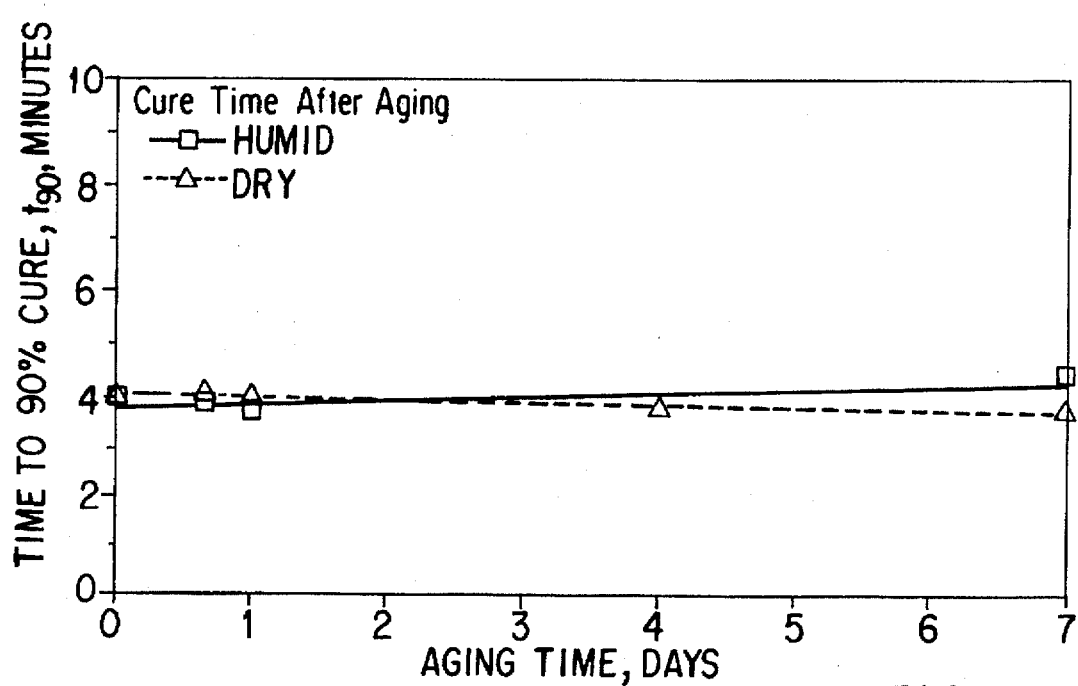
FIGS. 2A and 2B show similar plots for compounds of the invention.
Figure 2B:
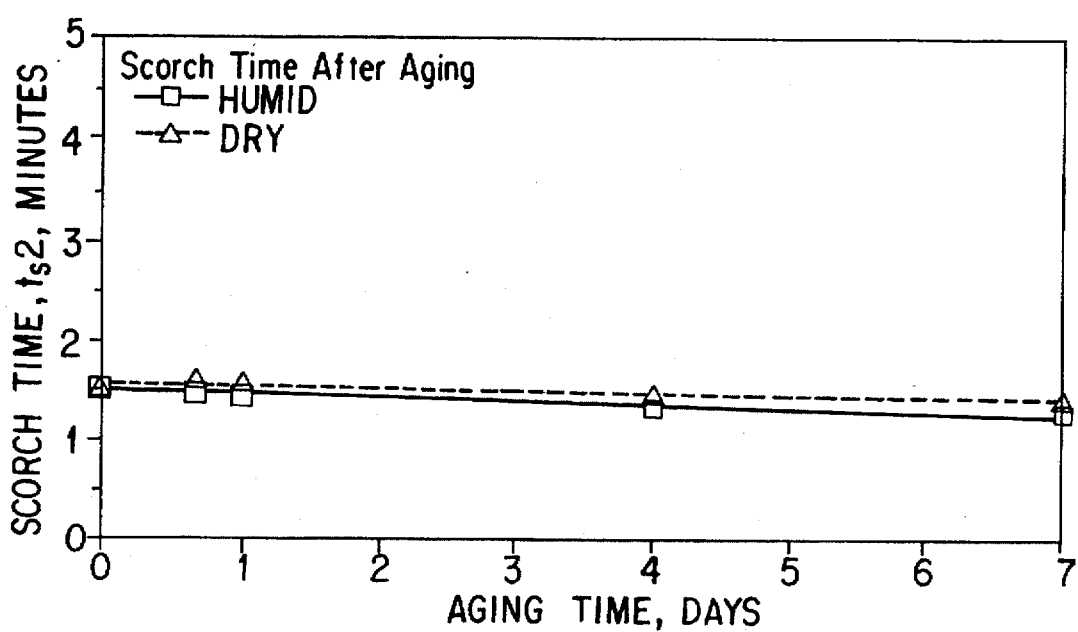

In the drawings, FIG. 1 is two graphs of a conventional control composition containing no GLY, showing the effect of aging in a dry or humid atmosphere on cure time and scorch time. FIG. 2 is two graphs of a composition of the present invention containing GLY, showing the effect of aging in a dry or humid atmosphere on cure time and scorch time.

The following examples illustrate the preparation of the vulcanizable compositions and vulcanizates thereof, properties of the vulcanizates, and the effect of water on scorching and the masking of the scorching in vulcanizates made from the present compositions. All compositions of the examples are given in parts by weight per hundred parts of the rubber (halogen-containing polymer) content (phr) except where indicated otherwise.

In the following examples the ingredients were mixed using standard procedure on laboratory mixers. Rubber physical properties were determined following ASTMD412-92. The extent of cure was measured from data obtained using a Monsanto oscillating disk rheometer (ODR) following the procedure of ASTMD2084-92. Scorch time was reported as $t_s2$, the time in minutes from closure of the ODR cavity until the torque increased 2 lbf.in above the minimum torque, which occurs a short time after cavity closure when the applied heat decreases the viscosity and lowers the torque before significant crosslinking occurs. Shorter scorch times during curing indicate that more scorch has taken place before curing, as compared to unaged composition. Thus, a reduction in the rate of scorching increase during storage is shown by a longer scorch time ($t_s2$). Cure time was reported as $t_{90}$, the time in minutes from closure of the ODR to reach 90% of increase from minimum to maximum vulcanization (cure) torque. Another advantage of this invention is the reduced time to cure show by the $t_{90}$ data.

Curing of the present invention compositions is not significantly affected by the presence of normal amounts of water absorbed during storage, typically at least about 0.05% by weight, more typically from about 0.05 to about 2% by weight, and often about 0.2% to 2% by weight of the composition. This is indicated by the scorch times and cure times of the compositions which are not significantly affected by the water content of the compositions. Scorch time and cure time are quantified in terms of the performance of the composition under curing conditions.

Thus, as the terminology is used herein, scorch time and cure time of a composition are not significantly affected by the presence of water when in curing using the conditions of Example 1 (ODR at about 350° F., 3° arc and 100 cpm), the scorch time and cure time ($t_s2$ and $t_{90}$ as herein defined) are not significantly changed by water absorption during storage. "Not significantly changed", as used herein, means that neither $t_s2$ nor $t_{90}$ of the composition during such curing decrease (as compared to the $t_s2$ and $t_{90}$ of the green, substantially moisture-free, unstored composition) after storage at ambient conditions of about 23° C. and 50% relative humidity of the composition for 1, 4 and 7 days by more than 30%, 50% and 75%, respectively; preferably, not more than 20%, 30% and 40%, respectively; and, most preferably, not more than 5%, 10% and 15%, respectively.

The most desirable relationship between these parameters is a sufficiently long scorch time to allow the compositions to be processed before start of cure, followed by a rapid cure. Provided the scorch time is adequate for handling, the smaller the $t_{90}$ to $t_s2$ ratio, the better the cure procedure. Since the compositions of the present invention mask the scorch effect of water, storage accompanied by the absorption of water does not affect the cure conditions. Thus, the cure/scorch time ratio of a composition of the present invention does not change significantly during storage, i.e., 1, 4, 7, days or more at ambient conditions of about 23° and 50° relative humidity. By "does not change significantly" it is meant that the $t_{90}/t_s2$ ratio does not change after 1, 4 and 7 days by more than about 35%, preferably not more than about 20%, and most preferably by not more than about 5%.

(While the tests presented herein are specific with respect to temperature and humidity, it should be understood that the vulcanizable compositions my be stored at temperatures and relative humidity normally encountered in commercial practice. Such relative humidities may typically range from about 20% to 100%.)

One additional advantage of the instant invention with respect to compositions comprising chlorinated polyethylene polymer is that $t_{90}/t_s2$ ratios below 4, preferably below 3, may be achieved.

Table I gives the ingredients in phr of compositions A and B used in Examples 1 to 5, excluding crosslinking agents 2-mercapto-1,3,4-thiadiozate-5-thiobenzoate ("ECHO" A, made by Hercules Incorporated, Wilmington, Del.), and GLY (Glycerin, U.S.P., J. T. Baker, Inc., Phillipsburg, N.J.). Chlorinated polyethylene (CPE) polymer containing 36% chlorine was used (Tyrin CM 0136, Dow Chemical Co., Plaquemine, La.).

TABLE 1

| Ingredient | Composition A | Composition B |
| --- | --- | --- |
| CPE | 100 | 100 |
| carbon black, N550* | 50 | — |
| carbon black, N762* | — | 50 |
| Plasticizer A (a) | 35 | — |
| Plasticizer B (b) | — | 30 |
| Magnesium Oxide | 5 | 10 |
| Stabilizer (c) | 2 | — |
| Amine Accelerator (d) | 1.15 | 1 |

*ASTM D1765-91
(a) trioctyl trimellitate
(b) di(butoxyethyoxyethyl)adipate

TABLE 1-continued

| Ingredient | Composition A | Composition B |
|---|---|---|

(c) styrenated diphenylamines ("Wingstay" 29, The Goodyear Tire and Rubber Co.)
(d) N-phenyl-3,5-diethyl-2-propyl-1,4-dihydropyridine ("Vanax" 808, R. T. Vanderbilt Company, Incorporated)

In the tables of the examples, $T_{min}$ is the torque in lbf.in when the composition reaches its minimum torque as the viscosity of the composition in the ODR decreases on heating before significant crosslinking. $T_{max}$ is the torque when maximum cure is reached, as indicated by no further torque increase with further heating time. $\Delta T$ is the difference from minimum to maximum torque (100% cure); $t_{90}$ and $t_s 2$ are defined above. Motor time is the time for the recorder pen of the data plotter to traverse the plotting span of the recorder paper, starting at the closing of the ODR cavity.

EXAMPLE 1

This example demonstrates the effect of aging and moisture on the vulcanization of CPE formulated with "ECHO" A (Tables 2 and 3), and with "ECHO" A and GLY (Tables 4 and 5). The compositions used in the tests of Tables 2,3,4 and 5 contained 193.15 phr of composition A (Table I) formulated with 2 phr of "ECHO" A; 1.75 phr of GLY was also formulated into the compositions for the tests of Tables 4 and 5. The tests were made using 1½"×½×¼" squares of pressed compositions aged in a desiccator at room temperature over anhydrous calcium sulfate (Tables 2 and 4—Dry Aging) and over water (Tables 3 and 5—Humid Aging). After aging, samples used in the tests of Tables 2 and 3 (no GLY) were vulcanized in a ODR at 350° F., 3° arc and 100 cpm; samples used in the tests of Tables 4 and 5 (with GLY) were vulcanized at 360° F., 3° arc and 100 cpm.

TABLE 2

DRY AGING (NO GLY)

| Test # | 1 | 2 | 3 | 4 |
|---|---|---|---|---|
| Days Aged | 0 | 1 | 3 | 7 |
| Weight Increase % | — | 0 | 0 | 0 |
| $T_{min}$ | 10.0 | 9.9 | 10.2 | 10.8 |
| $T_{max}$ | 36.0 | 34.0 | 33.5 | 34.0 |
| $\Delta T$ | 26.0 | 24.1 | 23.3 | 23.2 |
| $t_s 2$ | 7.9 | 7.8 | 7.8 | 7.1 |
| $t_{90}$ | 39.3 | 36.8 | 42.0 | 41.6 |
| $t_{90}/t_s 2$ | 5.0 | 4.7 | 5.4 | 5.9 |

TABLE 3

HUMID AGING (NO GLY)

| Test # | 1 | 2 | 3 | 4 |
|---|---|---|---|---|
| Days Aged | 0 | 1 | 3 | 7 |
| Weight Increase % | — | 0.3 | 0.6 | 1.1 |
| $T_{min}$ | 10.0 | 10.5 | 11.9 | 15.1 |
| $T_{max}$ | 36.0 | 53.3 | 56.2 | 60.0 |
| $\Delta T$ | 26.0 | 43.3 | 46.3 | 44.9 |
| $t_s 2$ | 7.9 | 4.3 | 3.2 | 2.2 |
| $t_{90}$ | 39.3 | 21.8 | 18.0 | 13.0 |
| $t_{90}/t_s 2$ | 5.0 | 5.1 | 5.6 | 5.9 |

TABLE 4

DRY AGING (WITH GLY)

| Test # | 9 | 10 | 11 | 12 | 13 |
|---|---|---|---|---|---|
| Days Aged | 0 | 0.67 | 1 | 4 | 7 |
| Weight Increase % | — | 0 | 0 | 0 | 0 |
| $T_{min}$ | 7.8 | 8.0 | 8.0 | 8.2 | 8.3 |
| $T_{max}$ | 53.0 | 52.1 | 52.0 | 50.8 | 51.0 |
| $\Delta T$ | 45.2 | 44.1 | 44.0 | 42.6 | 42.7 |
| $t_s 2$ | 1.5 | 1.6 | 1.55 | 1.45 | 1.4 |
| $t_{90}$ | 4.0 | 3.9 | 3.9 | 3.6 | 3.6 |
| $t_{90}/t_s 2$ | 2.7 | 2.4 | 2.5 | 2.5 | 2.6 |

TABLE 5

HUMID AGING (WITH GLY)

| Test # | 14 | 15 | 16 | 17 | 18 |
|---|---|---|---|---|---|
| Days Aged | 0 | 0.67 | 1 | 4 | 7 |
| Weight Increase % | 0 | 0.25 | 0.33 | 0.88 | 1.54 |
| $T_{min}$ | 7.8 | 8.1 | 8.1 | 8.8 | 9.1 |
| $T_{max}$ | 53.0 | 52.0 | 52.0 | 52.2 | 50.3 |
| $\Delta T$ | 45.2 | 43.9 | 43.9 | 43.4 | 41.2 |
| $t_s 2$ | 1.5 | 1.55 | 1.45 | 1.3 | 1.25 |
| $t_{90}$ | 4.0 | 3.8 | 3.6 | 3.6 | 4.3 |
| $t_{90}/t_s 2$ | 2.7 | 2.5 | 2.5 | 2.8 | 3.4 |

As can be seen in Table 3, humid aging of conventional compositions has a very significant effect on curing parameters-note particularly how the $\Delta T$ increases and, $t_s 2$ and $t_{90}$ times decrease with aging (Table 3). Dry aging (Table 2) has no apparent effect. Table 5 shows that the inclusion into Composition A (containing "ECHO" A) of GLY substantially completely masks the effect of water on aging—note particularly how the $\Delta T$, $t_s 2$ and $t_{90}$ times are substantially unaffected by humid aging. Dry aging (Table 4) has no apparent effect.

These data are plotted on the graphs of FIGS. 1 and 2. The data on the conventional compositions, FIG. 1, show that the humid samples stored over water had undergone significant pre-vulcanization scorching during storage, as shown by the decreasing scorch times $t_s 2$ and cure times $t_{90}$ as storage time increased. The dry samples showed no such scorch and cure time changes. This series of tests confirms that relative humidity during storage greatly affects the curing requirements of crosslinking halogen-containing polymer. In contrast, the data on the present invention compositions (FIG. 2) shows that the relative humidity during storage has no noticeable effect on either scorch or cure time. The presence of the GLY along with "ECHO" in the present invention compositions completely masks the effect of water in the composition.

For this reason, uniform vulcanizates are obtained batch to batch and after storing the same batch irrespective of water content of the material. In contrast, the conventional compositions of FIG. 1 are greatly affected by storage at humid conditions; batches of the same ingredients stored the same time at the same temperature, but at different relative humidity will respond differently to a standard cure cycle and will give variable properties in the vulcanization.

As can be seen in Table 5, the compositions of the present invention aged at room temperature and 100% relative humidity absorb significant amounts of water, approximately 0.25, 0.33, 0.88 and 1.54% weight increase of the composition respectively after storage for 0.67, 1, 4 and 7 days. At lower relative humidity the percent water absorption would be less. However, after storage at any relative humidity some water will be present in the compositions. The amount of absorbed water increases as the storage time increases. Thus, since some water is normally present in the air during storage, the stored compositions of the present invention will contain water from a trace to as much as 2% by weight or more (normally greater than about 0.05% by weight, more typically from about 0.05 to 2% by weight, and often about 0.2% to 2% by weight). The stored compositions will comprise vulcanizable halogen-containing polymer; 2-mercapto-1,3,4-thiadiazole-5-thiobenzoate; GLY and a small amount of water. Note that this small amount of water is sufficient to cause scorching in the conventional samples of FIG. 1.

EXAMPLE 2—EFFECT OF WATER IN THE COMPOSITION

The effect of adding water to the vulcanizable compositions is shown in Table 6. 193.15 parts of Composition A plus 2 phr of "ECHO" A were used in Test 19 and 20; Test 19 composition also contained 5 phr of GLY and no added water; Test 20 also contained 4.55 phr of GLY and 0.45 phr of added water. Test 19 and 20 were vulcanized using a ODR at 360° F., 3° arc, 100 cpm, and 12 minute motor time with the following results:

TABLE 6

| | ODR CURE DATA | |
|---|---|---|
| Test # | 19 | 20 |
| $T_{min}$ | 4.9 | 6.1 |
| $T_{max}$ | 50.6 | 50.2 |
| $\Delta T$ | 45.7 | 44.1 |
| $t_s2$ | 1.05 | 1.1 |
| $t_{90}$ | 4.6 | 4.5 |
| $t_{90}/t_s2$ | 4.4 | 4.1 |

These tests show that the addition of small amounts of water to the compositions of the present invention has no significant effect on the curing times. Like the Table 5 results, these results are obtainable in batch to batch replications of these tests.

EXAMPLE 3

This example illustrates in Tests 23–27 the preferred practice of the present invention. The compositions of Example 3 consist of 193.15 parts of composition A of Table I and contain 2 phr "ECHO" A; Tests 21 and 22 contain no GLY; Tests 23–27 contain 1.75 phr of GLY. Tests 23–27 demonstrate the excellent curability of the vulcanizable compositions of the present invention as compared to Tests 21 and 22, which do not contain GLY. Curing was carried out in these examples using an ODR at 360° F., 3° arc and 100 cpm. These tests were performed on unstored, freshly formulated compositions. The curing results are shown in Table 7.

TABLE 7

| | ODR CURE DATA | | | | | | |
|---|---|---|---|---|---|---|---|
| Test # | 21 | 22 | 23 | 24 | 25 | 26 | 27 |
| $T_{min}$ | 6.1 | 5.0 | 7.8 | 4.5 | 5.0 | 6.8 | 5.1 |
| $T_{max}$ | 39.2 | 41.1 | 53.0 | 46.2 | 49.3 | 50.8 | 48.9 |
| $\Delta T$ | 33.1 | 36.1 | 45.2 | 41.7 | 44.3 | 44.0 | 43.8 |

TABLE 7-continued

| | ODR CURE DATA | | | | | | |
|---|---|---|---|---|---|---|---|
| Test # | 21 | 22 | 23 | 24 | 25 | 26 | 27 |
| $t_s2$ | 2.5 | 2.7 | 1.5 | 1.65 | 1.8 | 1.67 | 1.9 |
| $t_{90}$ | 29.0 | 25.0 | 4.0 | 4.6 | 4.8 | 4.4 | 5.0 |
| $t_{90}/t_s2$ | 11.6 | 9.3 | 2.7 | 2.8 | 2.7 | 2.6 | 2.6 |

In Tests 23–27 all of the scorch times of the present invention compositions were adequate and all of the $t_{90}/t_s2$ ratios were less than the preferred maximum of 3. Of particular importance are the extremely rapid $t_{90}$ times for the compositions of the present invention containing both "ECHO" A and GLY.

EXAMPLE 4—PHYSICAL PROPERTIES

The tests of this example show the physical properties of vulcanizates from unaged compositions of the present invention press cured five minutes at 360° F. All of the tests used 191 phr mixture B from Table i and contained 2 phr of "ECHO" A. Test 28 contained no glycerin; Test 29–32 contained 1.75 phr GLY. In Table 8, M100, M200 and M300 are the psi required to extend the vulcanized test samples 100, 200 and 300% respectively; TB is the tensile strength at break; EB is the % elongation at break, and Hardness is Shore A.

TABLE 8

| | PHYSICAL PROPERTIES | | | | |
|---|---|---|---|---|---|
| Test # | 28 | 29 | 30 | 31 | 32 |
| M100 | 560 | 620 | 670 | 620 | 640 |
| M200 | 1160 | 1270 | 1380 | 1280 | 1430 |
| M300 | 1630 | 1750 | 1880 | 1820 | 2020 |
| TB | 2140 | 2150 | 2320 | 2350 | 2440 |
| EB | 450 | 400 | 420 | 430 | 400 |
| Hardness | 70 | 71 | 71 | 73 | 73 |

EXAMPLE 5—EPICHLOROHYDRIN POLYMERS

This Example shows the practice of the present invention with epichlorohydrin polymers. The polyepichlorohydrin polymer was Hydrin H from Zeon Chemicals USA, Inc., Louisville, Ky. The epichlorohydrin-ethylene oxide copolymer was the 1:1 molar polymer available as Hydrin C from Zeon Chemicals USA, Inc. The compositions shown in Table 9 were vulcanized in an ODR at 340° F., 3° arc, 100 cpm. Table 9 also lists the ODR cure times.

Tests 34 and 36, which contain 2.0 phr GLY, cured more rapidly (shorter t90) and completely (higher ΔTorque) than the control compositions, Tests 33 and 35, which did not contain GLY.

TABLE 9

| | COMPOSITIONS (PARTS BY WEIGHT) | | | |
|---|---|---|---|---|
| Test | 33 | 34 | 35 | 36 |
| polyepichlorohydrin | — | — | 100 | 100 |
| epichlorohydrin-ethylene oxide copolymer | 100 | 100 | — | — |
| carbon black, N550 | 50 | 50 | 50 | 50 |

TABLE 9-continued

COMPOSITIONS (PARTS BY WEIGHT)

| Test | 33 | 34 | 35 | 36 |
|---|---|---|---|---|
| stearic acid | 1 | 1 | 1 | 1 |
| nickel dibutyldithiocarbonate | 0.5 | 0.5 | 0.5 | 0.5 |
| nickel dimethyldithiocarbonate | 1.0 | 1.0 | 1.0 | 1.0 |
| barium carbonate | 5.0 | 5.0 | — | — |
| magnesium oxide | — | — | 5.0 | 5.0 |
| "ECHO" A | 2.8 | 2.8 | 2.8 | 2.8 |
| GLY | — | 2.0 | — | 2.0 |
| ODR CURE DATA | | | | |
| $T_{min}$ | 11.6 | 9.6 | 9.6 | 5.6 |
| $T_{max}$ | 121.6* | 136.0 | 114.2** | 120.4 |
| ΔTorque | 110.0 | 126.4 | 104.6 | 114.8 |
| $t_s2$ | 2.4 | 1.3 | 6.3 | 2.5 |
| $T_{90}$ | 42.8 | 18.4 | 88.5 | 30.3 |

*Torque still rising after 60 minutes.
**Torque still rising after 120 minutes.

EXAMPLE 6—POLYACRYLATE RUBBER

This example shows the practice of the present invention with polyacrylate rubber (a copolymer of ethyl acrylate and a chloroalkyl acrylate containing about 1–4% chlorine, available as Nipol AR 71 from Zeon Chemicals USA, Inc., Louisville, Ky.). The compositions of both tests contained 100 parts polyacrylate rubber; 50 parts carbon black, N330; 1.0 parts of stearic acid; 2.0 parts of diphenylamine/acetone reaction product; 10 parts of magnesium oxide; and 1.5 parts of "ECHO" A. Test 37 contained no GLY; Test 38 contained 2.0 parts of GLY.

The compositions were vulcanized in an ODR at 360° F., 3° arc and 100 cpm with a motor run time of 30 minutes. Table 10 lists the ODR cure data.

Test 38, which contained 2 phr GLY, cured more rapidly (shorter $t_{90}$) and completely (higher ΔTorque) than the control composition, Test 37, which did not contain GLY.

TABLE 10

ODR CURE DATA

| Test # | 37 | 38 |
|---|---|---|
| $T_{min}$ | 12.0 | 13.5 |
| $T_{max}$ | 53.9* | 69.9 |
| ΔTorque | 41.9* | 56.4 |
| $t_s2$ | 2.8 | 0.9 |
| $t_{90}$ | 42.3* | 23.0 |

*Torque still rising after 30 minutes.

EXAMPLE 7—CHLOROSULFONATED POLYETHYLENE

This example shows the practice of the present invention with chlorosulfonated polyethylene. The chlorosulfonated polyethylene contained 35% chlorine and 1% sulfur (Hypalon 40, E. I. DuPont de Nemours and Co., Wilmington, Del.). The compositions of both tests contained 100 parts chlorosulfonated polyethylene; 40 parts of carbon black, N774; 10 parts of aromatic oil; 1.0 parts of stearic acid; 5.0 parts of magnesium oxide; and 2.5 parts of "ECHO" A. Test 39 contained no GLY; Test 40 contained 2.0 parts of GLY.

The compositions were vulcanized in an ODR at 340° F., 3° arc, 100 cpm. Table 11 lists the ODR cure data.

Test 40, which contained 2.0 phr GLY, cured more rapidly (lower $t_{90}$) and completely (higher ΔTorque) than the control composition, Test 39, which did not contain GLY.

TABLE 11

ODR CURE DATA

| Test # | 39 | 40 |
|---|---|---|
| $T_{max}$ | 11.2 | 10.0 |
| $T_{min}$ | 69.7* | 86.0 |
| ΔTorque | 58.5* | 76.0 |
| $t_s2$ | 0.93 | 0.66 |
| $t_{90}$ | 7.9* | 5.6 |

*Torque still rising after 12 minutes.

EXAMPLE 8—POLYCHLOROPRENE RUBBER

This example shows the practice of the present invention with polychloroprene rubber. The compositions of both tests contained 100 parts of polychloroprene rubber (Neoprene W, E. I. DuPont de Nemours and Co., Wilmington, Del.); 50 parts of carbon black, N762; 10 parts of aromatic oil; 5 parts of barium carbonate; 0.5 parts of stearic acid; and 1.5 parts of "ECHO" A. Test 41 contained no GLY; Test 42 contained 2.0 parts GLY.

The compositions were vulcanized in an ODR at 307° F., 3° arc and 100 cpm with a motor run time of 60 minutes. Table 12 lists the ODR cure data. Both products were acceptable vulcanizates.

Test 42, which contained 2.0 phr GLY, had a desirable longer scorch time ($t_s2$) and about the same cure time ($t_{90}$) as the control composition (Test 41), which did not contain GLY. GLY appeared to plasticize the composition, based on the lower $T_{min}$ and $T_{max}$ of Test 42.

TABLE 12

ODR CURE DATA

| Test # | 41 | 42 |
|---|---|---|
| $T_{min}$ | 13.0 | 10.0 |
| $T_{max}$ | 112.0 | 96.0 |
| ΔTorque | 99.0 | 86.0 |
| $t_s2$ | 1. | 2.5 |
| $t_{90}$ | 35.3 | 33.8 |

EXAMPLE 9—HALOBUTYL RUBBER

This example shows the practice of the present invention with halobutyl rubber. The compositions of all of the tests contained 50 parts of carbon black, N330; 1.0 parts of stearic acid; 5.0 parts of stearic acid; 1.0 parts of N-phenyl-3,5-diethyl-2-propyl-1, 4-dihydropyridine; and 2.5 parts of "ECHO" A. Tests 43 and 44 contained 100 parts of bromobutyl rubber (containing 2.1% bromine, Bromobutyl 2030, Polysar Rubber Division, Miles, Inc., Sarnia, Ontario). Tests 45 and 46 contained 100 parts chlorobutyl rubber (containing 2 mol % unsaturation, Chlorobutyl 1066, Exxon Chemicals Americas, Linden, N.J.). Tests 43 and 45 contained no GLY; Tests 44 and 46 contained 2.0 parts of GLY.

The compositions were vulcanized in an ODR at 320° F., 3° arc and 100 cpm with a motor run time of 12 minutes. Table 13 lists the vulcanization times. All products were acceptable vulcanizates.

TABLE 13

ODR CURE DATA

| Test # | 43 | 44 | 45 | 46 |
|---|---|---|---|---|
| $T_{min}$ | 15.9 | 17.0 | 14.3 | 14.5 |
| $T_{max}$ | 74.0 | 71.0 | 63.0* | 52.3* |
| Torque | 58.1 | 54.0 | 48.7* | 37.8* |
| $t_s2$ | 1.0 | 0.9 | 2.3 | 2.0 |
| $t_{90}$ | 22.2 | 33.2 | 43.0* | 44.2* |

*Torque still rising after 12 minutes.

What is claimed:

1. A process of reducing the effects of moisture during storage prior to vulcanization of a vulcanizable chlorine- or bromine-containing polymer composition containing water, comprising blending before storage, into said vulcanizable composition, about 1 to 20 phr of thioester derivative of 2,5-dimercapto-1,3,4-thiadiazole crosslinking agent and about 0.1 to 20 phr glycerin, whereby the scorch time $t_s2$ of the vulcanizable compound does not decrease by more than about 30% after storage in the presence of moisture for 1 day.

2. The process of claim 1 wherein said crosslinking agent is 2-mercapto-1,3,4-thiadiazole-5-thiobenzoate.

3. The process of claim 1 wherein the vulcanizable chlorine- or bromine-containing polymer is selected from the group consisting of epichlorohydrin polymers, copolymers and terpolymers.

4. The process of claim 1 whereby the cure time of the vulcanizable compound is not significantly affected by the water content of said composition.

5. The process of claim 1 wherein the vulcanizable chlorine- or bromine-containing polymer is a polyacrylate rubber.

6. The process of claim 4 wherein when the vulcanizable composition is stored in the presence of moisture $t_s2$ and $t_{90}$ do not decrease by more than about 30% after storage for 1 day.

7. The process of claim 2 wherein when the vulcanizable composition is stored in the presence of moisture $t_s2$ does not decrease by more than about 20% after storage for 1 day.

8. The process of claim 1 wherein when the vulcanizable composition is stored in the presence of moisture $t_s2$ and $t_{90}$ do not decrease by more than about 5% after storage for 1 day.

9. The process of claim 1 wherein when the vulcanizable composition is stored in the presence of moisture $t_s2$ and $t_{90}$ do not decrease by more than about 50% after storage for 4 days.

10. The process of claim 2 wherein when the vulcanizable composition is stored in the presence of moisture $t_s2$ and $t_{90}$ do not decrease by more than about 30% after storage for 4 days.

11. The process of claim 1 wherein when the vulcanizable composition is stored in the presence of moisture $t_s2$ and $t_{90}$ do not decrease by more than about 15% after storage for 4 days.

12. The process of claim 1 wherein when the vulcanizable composition is stored in the presence of moisture $t_s2$ and $t_{90}$ do not decrease by more than about 50% after storage for 7 days.

13. The process of claim 1 wherein when the vulcanizable composition is stored in the presence of moisture $t_s2$ does not decrease by more than about 40% after storage for 7 days.

14. The process of claim 2 wherein when the vulcanizable composition is stored in the presence of moisture $t_s2$ and $t_{90}$ do not decrease by more than about 40% after storage for 7 days.

15. The process of claim 1 wherein when the vulcanizable composition is stored in the presence of moisture $t_s2$ does not decrease by more than about 15% after storage for 7 days.

16. The process of claim 1 wherein when the vulcanizable composition is stored in the presence of moisture $t_s2$ and $t_{90}$ do not decrease by more than about 15% after storage for 7 days.

17. The process of claim 13 wherein there is included in said composition about 0.5 to 5 phr of 2-mercapto-1,3,4-thiadiazole-5-thiobenzoate and about 0.5 to 10 phr of glycerin.

18. The process of claim 14 wherein there is included in said composition about 1.0 to 5 phr of glycerin.

19. The process of claim 2 wherein there is included in said composition an acid acceptor and an accelerator.

20. The process of claim 13 wherein there is included in said composition an acid acceptor in an amount of from about 0.25 phr to 50 phr, and an accelerator in an amount of from about 0.5 phr to 3 phr.

21. The process of claim 2 wherein there is included in said composition a stabilizer.

22. The process of claim 20 wherein there is included in said composition about 0.1 phr to 5 phr of a stabilizer.

23. A process of reducing the effects of moisture during storage prior to vulcanization of a vulcanizable chlorine- or bromine-containing polymer composition containing water, comprising blending before storage, into said vulcanizable composition, about 1 to 20 phr of thioester derivative of 2,5-dimercapto-1,3,4-thiadiazole crosslinking agent and about 0.1 to 20 phr glycerin, whereby the scorch time of the vulcanizable compound is not significantly affected by the water content of said composition and wherein said composition contains about 0.05% to 2% of water at the start of vulcanization.

24. The process of claim 2 wherein said composition contains at least about 0.05% of water at the start of vulcanization.

25. The process of claim 13 wherein said composition contains at least about 0.2% of water at the start of vulcanization.

26. The process of claim 14 wherein said composition contains about 0.2% to 2% of water at the start of vulcanization.

27. The process of claim 1 wherein the vulcanizable chlorine- or bromine-containing polymer is chlorinated polyethylene polymer and $t_{90}/t_s2$ is below 4.

28. The process of claim 2 wherein the vulcanizable chlorine- or bromine-containing polymer is chlorinated polyethylene polymer and $t_{90}/t_s2$ is below 3.

29. The process of claim 1 wherein $t_{90}/t_s2$ does not change after 1 day of storage in the presence of moisture by more than about 35%.

30. The process of claim 2 wherein $t_{90}/t_s2$ does not change after 1 day of storage in the presence of moisture by more than about 20%.

31. The process of claim 8 wherein $t_{90}/t_s2$ does not change after 1 day of storage in the presence of moisture by more than about 5%.

32. The process of claim 1 wherein $t_{90}/t_s2$ does not change after 4 days of storage in the presence of moisture by more than about 35%.

33. The process of claim 2 wherein $t_{90}/t_s2$ does not change after 4 days of storage in the presence of moisture by more than about 20%.

34. The process of claim 11 wherein $t_{90}/t_s2$ does not change after 4 days of storage in the presence of moisture by more than about 5%.

35. The process of claim 1 wherein $t_{90}/t_s2$ does not change after 7 days of storage in the presence of moisture by more than about 35%.

36. The process of claim 2 wherein $t_{90}/t_s2$ does not change after 7 days of storage in the presence of moisture by more than about 20%.

37. The process of claim 16 wherein $t_{90}/t_s2$ does not change after 7 days of storage in the presence of moisture by more than about 5%.

38. The process of claim 1 wherein the vulcanizable chlorine- or bromine-containing polymer is selected from the group consisting of homopolymers of epichlorohydrin, copolymers of epichlorohydrin and ethylene oxide or propylene oxide, terpolymers of epichlorohydrin, ethylene oxide or propylene oxide, and an unsaturated alkylene oxide, polychloroprene, chlorosulfonated polyethylene, chlorinated high density polyethylene, copolymers of alkyl acrylate and chloroalkyl acrylate, poly(vinyl chloride), poly(vinylidene chloride), chlorobutyl rubber and bromobutyl rubber.

39. The process of claim 1 wherein the vulcanizable chlorine- or bromine-containing polymer is a chlorinated polyethylene polymer.

40. The process of claim 4 wherein the vulcanizable chlorine- or bromine-containing polymer is selected from the group consisting of homopolymers of epichlorohydrin, copolymers of epichlorohydrin and ethylene oxide or propylene oxide, terpolymers of epichlorohydrin, ethylene oxide or propylene oxide, and an unsaturated alkylene oxide, polychloroprene, chlorosulfonated polyethylene, chlorinated high density polyethylene, copolymers of alkyl acrylate and chloroalkyl acrylate, poly(vinyl chloride), poly(vinylidene chloride), chlorobutyl rubber and bromobutyl rubber.

41. The process of claim 23 wherein when the vulcanizable composition is stored in the presence of moisture $t_s2$ does not decrease by more than about 30% after storage for 1 day.

42. The process of claim 4 wherein the vulcanizable chlorine- or bromine-containing polymer is a chlorinated polyethylene polymer.

43. The process of claim 4 wherein the vulcanizable chlorine- or bromine-containing polymer is selected from the group consisting of epichlorohydrin polymers, copolymers and terpolymers.

* * * * *